United States Patent [19]

Culley et al.

[11] Patent Number: 5,163,143
[45] Date of Patent: Nov. 10, 1992

[54] ENHANCED LOCKED BUS CYCLE CONTROL IN A CACHE MEMORY COMPUTER SYSTEM

[75] Inventors: Paul R. Culley, Cypress; Mark Taylor, Houston, both of Tex.

[73] Assignee: Compaq Computer Corporation, Houston, Tex.

[21] Appl. No.: 431,742

[22] Filed: Nov. 3, 1990

[51] Int. Cl.[5] .......................................... G06F 12/06
[52] U.S. Cl. .............................. 395/425; 364/DIG. 1; 364/242.91; 364/958
[58] Field of Search ... 364/200 MS File, 900 MS File, 364/242.91, 242.92, 243.4, 243.6, DIG. 1; 395/425

[56] References Cited

U.S. PATENT DOCUMENTS

| | | | |
|---|---|---|---|
| 4,257,095 | 3/1981 | Nadir | 364/200 |
| 4,669,043 | 5/1987 | Kaplinsky | 364/200 |
| 4,787,032 | 11/1988 | Culley | 364/200 |
| 4,933,835 | 6/1990 | Sachs et al. | 364/200 |
| 4,989,113 | 1/1991 | Hull, Jr. et al. | 364/200 |
| 5,041,962 | 8/1991 | Lunsford | 364/200 |
| 5,050,072 | 9/1991 | Earnshaw et al. | 364/200 |
| 5,072,369 | 10/1991 | Theus et al. | 364/200 |

OTHER PUBLICATIONS

Intel Corporation, Microprocessors 1990, pp. 4-170 to 4-304.
Intel Corporation, Microprocessors 1990, pp. 4-343 to 4-409.
International Business Machines Corp., Supplements for the PS/2 Model 70 Technical Reference, Sep. 1988, pp. 3-20 and 3-21.

*Primary Examiner*—Joseph L. Dixon
*Assistant Examiner*—Frank J. Asta
*Attorney, Agent, or Firm*—Pravel, Gambrell, Hewitt, Kimball & Krieger

[57] ABSTRACT

An enhanced processor lock cycle management system for computer systems including a processor 10 and a cache memory controller 12 which accommodates existing methodologies and provides an enhanced mode wherein processor lock cycles are not passed to the controlled 12 but control of the system bus 14 by controller 12 is maintained by inhibiting hold requests to the controller 12 by other system elements.

5 Claims, 3 Drawing Sheets

ENHANCED LOCKED BUS CYCLE CONTROL IN A CACHE MEMORY COMPUTER SYSTEM

BACKGROUND OF THE INVENTION

This invention relates to personal computer systems and in particular to systems in which certain program instructions are executed by the processor in a locked bus cycle mode. Locked instructions are typically instructions which need to be executed in consecutive bus cycles.

DISCUSSION OF RELATED ART

Personal computer systems have developed from systems utilizing a single processing unit or CPU to systems which include multiple processors operating in parallel with advanced memory devices and memory controllers. More advanced systems included arithmetic coprocessors, such as the Intel 80386 and 80387 processor/coprocessor circuits, as well as peripheral memory devices such as floppy disk and fixed-disk memory devices.

To provide enhanced memory access these systems were provided with a relatively small high speed static random access memory, known as a cache memory, wherein a portion of data or code stored in the system's main memory was duplicated and available to the processor for quick access. Idealized cache memory systems seek to match the data or code held in the cache to the upcoming processor data or code requests to minimize the number of times the processor has to access system main memory.

Updating and maintaining the directory to the cache memory in such systems is performed by a device known as a cache controller. One such device is the Intel 82385 controller designed for use with the 80386 microprocessor. The cache controller interfaces between the processor and the cache and main memories via one or more system busses. Details of an example of such systems is set forth in the Intel system design handbooks for the 80386 family, such as the *Microprocessor and Peripheral Handbook*, Volume 1, at pages 4-292 through 4-353 of the October, 1988 reference manual.

Further developments to enhance the speed at which the system operated included the addition of direct memory access devices which permitted system elements other than the processors to access system memory directly without going through the processors. To control director memory access by various system elements, another device known as a DMA controller was included in advanced systems. One such device is the Intel 82386 32-bit DMA controller.

In these more advanced systems, the various elements, including the processor, are necessarily connected to a common bus or series of busses to access memory and to communicate data, control and address signals to other system elements. System elements which are able to obtain control of a bus are known as bus masters. Since only one bus master can have control of the bus at one time it was necessary to develop bus control logic circuitry which controlled which bus master had access to the bus or busses and arbitrated between conflicting requests on the basis of assigned priorities. In such arbitration schemes, if a first bus master had control of the bus when a second bus master with a higher priority requested the bus, the arbitration logic would typically put the first device in a hold state and transfer control of the bus to the second bus master to complete the higher priority transaction. In such systems it is therefore possible that control of the bus by a bus master, such as the processor, could be interrupted.

Interruption of the processor in general did not pose a problem. Where the processor was executing instructions or performing tasks which needed to be executed in consecutive bus cycles it was necessary to provide a means to prevent the loss of control of the bus until such instructions or program steps were completed. Advanced systems such as those based on the 80386 processor used locked bus cycles to ensure that certain processor operations were carried out in consecutive bus cycles.

One example of a situation where it is important that consecutive bus cycles be utilized is semaphore sequences. Semaphores are registers whose value indicates the status or condition of a system device. A semaphore sequence is one, for example, wherein the processor on a first bus cycle reads a status bit of a device to determine if it is available for use by the processor. If the semaphore bit value indicates that the device is available, on the next bus cycle, the processor writes to the status bit a new value which indicates that the processor intends to take control of the device. In these situations it is important that the read and write cycles by the processor are locked to prevent another bus master, such as another processor or the DMA controller, from reading or writing to the device between the processor read and write cycles.

In advanced systems, it is also desirable to use locked bus cycles in other cases. In multi-tasking environments utilizing the protected mode features of the 80386 processor task switching involves updating of system segment descriptors and pointers which are by design in the 80386 systems executed in locked bus cycles. Interrupt handling also utilizes locked bus cycles.

In systems with a very limited number of bus masters locked bus cycles do not substantially detract from system performance. In systems with many bus masters and in particular in systems with cache memory, the number of locked bus cycles executed by the processor or processors substantially detracts from the operating speed of the system.

In systems with cache memories and associated cache memory controllers the cache controller interfaces between the processor and the system bus. Main memory is accessible by the processor through the cache controller and the system bus. A local bus is established between the cache controller and the processor with the high speed cache memory being available on the local bus. Ideally, the cache controller operates to anticipate data and code requests by the processor and maintains duplicates of these segments of main memory in the high speed local cache memory. The more frequently the processor data or code request is processed through to system main memory, a CACHE MISS, generally the slower the system operates. It is thus desirable to keep the cache memory updated to increase the CACHE HIT rate, and to utilize data in the cache memory whenever possible.

In prior systems which included an advanced processsor such as the 80386 and a cache memory system including the Intel 82385 cache controller, the use of locked bus cycles detracted from system performance because the locked cycles from the processor effected the efficiency of cache controller operation. Thus in prior systems, designers had to choose between the desirability of using locked bus cycles to prevent errors and the desirability to use few or no locked bus cycles to enhance overall the system efficiency.

The 80386 processor flags locked bus cycles by asserting an active low LOCK* output signal. During a locked sequence, the processor will not relinquish control of the system bus. The cache controller, such as the 82385, by design forces all processor locked bus cycles (except for those designated as local bus access) to run on the system bus whether or not the referenced location resides in the cache memory. Thus memory read and write cycles if locked are always forced onto the system bus, which detracts from the utilization of cache memory.

In addition, locked processor cycles are run as locked controller cycles wherein the cache controller asserts its BLOCK* output preventing the controller from being interrupted. Locked writes effect the cache memory as do locked read misses causing the cache memory to be updated. Locked read hits, however, are forced onto the system bus, even though the data is resident in cache, and the data is recopied into cache as it returns from system memory via the system bus. In the prior art Intel design, locking of the controller and the use of locked processor signals was necessary to ensure against errors such as might occur if some operations such as semaphore sequences are interrupted.

An alternative, and one adopted in International Business Machines PS2 Model 70-A21 systems, is to disable the LOCK* output of the 80386 processor(s) thereby reducing delays associated with locked bus cycles in the Intel design. As noted above, this solution is not satisfactory where there are a number of bus masters in the system because the possibility of interruption of certain processor cycles introduces errors such as the semaphore problem discussed above.

SUMMARY OF THE INVENTION

The present invention provides a system which accommodates prior art locked bus cycle implementation, such as that utilized by standard Intel 80386 systems and that utilized in the more recently introduced IBM OS2-/A21 systems, and which provides as a third option a new and improved modified lock cycle implementation. In modified lock cycle mode, the system of the present invention maintains the advantages of locked bus cycles, but avoids the system delays inherent in locked cycle operation in cache memory systems.

The system of the present invention provides a cache control register or port wherein the value of specified bits sets the locked bus cycle operation to one of three modes. Mode one passes all processor locked cycles to the cache controller simulating the prior Intel method. Mode two disables the locked cycle output of the processor, thereby preventing the cache controller from operating in a locked mode similar to the IBM OS2-/A21 method. Mode three provides an enhanced lock cycle methodology which allows most locked cycles from the processor to execute out of the cache memory and allows multiprocessing with shared memory without increasing the possibility of semaphore errors.

The enhanced locked cycle operation generally utilizes the LOCK* output from the processor to detect a processor locked cycle, and depending on the status of bus control utilizes the controller's HOLD input to prevent interruption of the controller without putting the controller in a locked mode.

BRIEF DESCRIPTION OF THE DRAWINGS

A better understanding of the present invention can be obtained when the following detailed description of the preferred embodiment is read in conjunction with the following drawings, wherein.

DESCRIPTION OF THE PREFERRED EMBODIMENT

Figure 1:
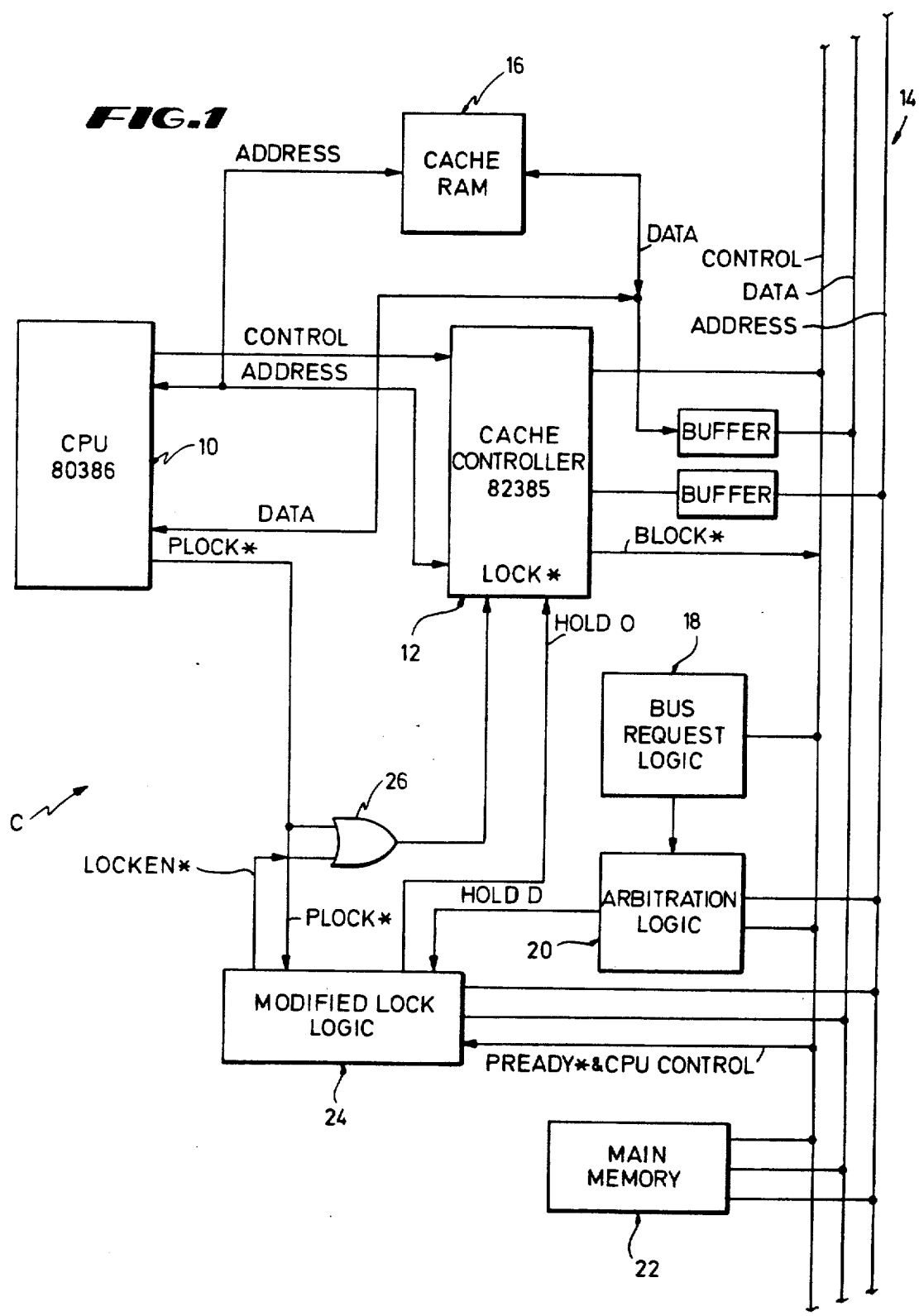
FIG. 1 is a schematic block diagram of a system incorporating the present invention.

Referring now to FIG. 1, the letter C designates a computer system incorporating the present invention. System C includes a processor 10 and a cache controller 12 interfaced in a conventional manner with a system bus 14. Processor 10 is preferably an Intel 80386 microprocessor and controller 12 is preferably an Intel 82385 cache controller. Associated with controller 12 is a high speed static random access memory 16 which serves as a cache memory accessed and controlled via the system bus 14 by the cache controller 12.

System C also includes bus request logic circuit 18 and arbitration logic circuit 20. Bus request logic circuit 18 and arbitration logic circuit 20 initiate and control access to system bus 14 in response to bus control signals from bus masters such as controller 12. While the system shown in FIG. 1 is configured as a single processor system, it should be noted that the present invention has particular advantages in multi-processor, multi-bus master environments. In such systems peripheral devices such as fixed disk memory, communications, printer ports, coprocessors and other complete processor/controller sub-systems will be typically interfaced to, and require arbitrated access to, system bus 14.

These more complex systems typically also include direct memory access control circuitry which permits peripheral devices to acquire the bus for direct access to system main memory 22 without going through and consequently interrupting the processor 10. Such conventional additional system elements do not form a part of the present invention and have been omitted for clarity.

For the purpose of the present invention it is sufficient to note that access to the system bus 14 by processor 10 is initiated via controller 12 which causes a bus request signal to be initiated by logic circuit 18 and provided to arbitration circuit 20. Arbitration circuit 20 in accordance with a prescribed arbitration scheme determines priority from any conflicting bus requests and issues HOLD instructions to any bus master currently controlling the bus via bus 14. A bus master in control of the bus responds in a conventional manner and returns a HOLD ACKNOWLEDGMENT signal indicating it has relinquished control of the bus so that the requesting bus master may acquire control.

In this conventional format, when a bus master such as processor 10/controller 12 has control of the bus and is executing a LOCKED bus cycle, it will not respond to HOLD requests until the LOCKED cycles are completed. Typically, each system element issues an end of cycle signal, such as a PRDY* signal in the case of an 80386 processor to indicate the cycle is complete and the system element is ready to accept further instructions. The advantages of the present invention are achieved by the manner in which processor locked cycles and corresponding controller locked cycles are processed via modified lock circuitry 24 and ORGATE 26.

In the system of the present invention, LOCKED bus cycles from processor 10 are indicated by an active low level PLOCK* output signal from the processor. This PLOCK* signal in conventional Intel systems would be in all cases passed to controller 12 causing the controller to assert its BLOCK* output active to prevent interruption of the control of the bus and also causing controller 12 to operate in a locked mode as described above.

In the system of the present invention, the PLOCK* signal is provided as an input signal to modified lock circuit 24, which in the manner and under the circumstances described below provides an enabling output LOCKEN* signal to ORGATE 26 in those circumstances where it is desired to operate the controller in locked mode. When the system is operating in modified lock mode, in most instances controller 12 is not placed in locked mode, but control of the bus by controller 12 is maintained by intercepting controller HOLD requests via bus 14 and arbitration logic circuit 20 and providing logic circuitry internal to circuit 24 which inhibits the HOLD request.

Figure 2:
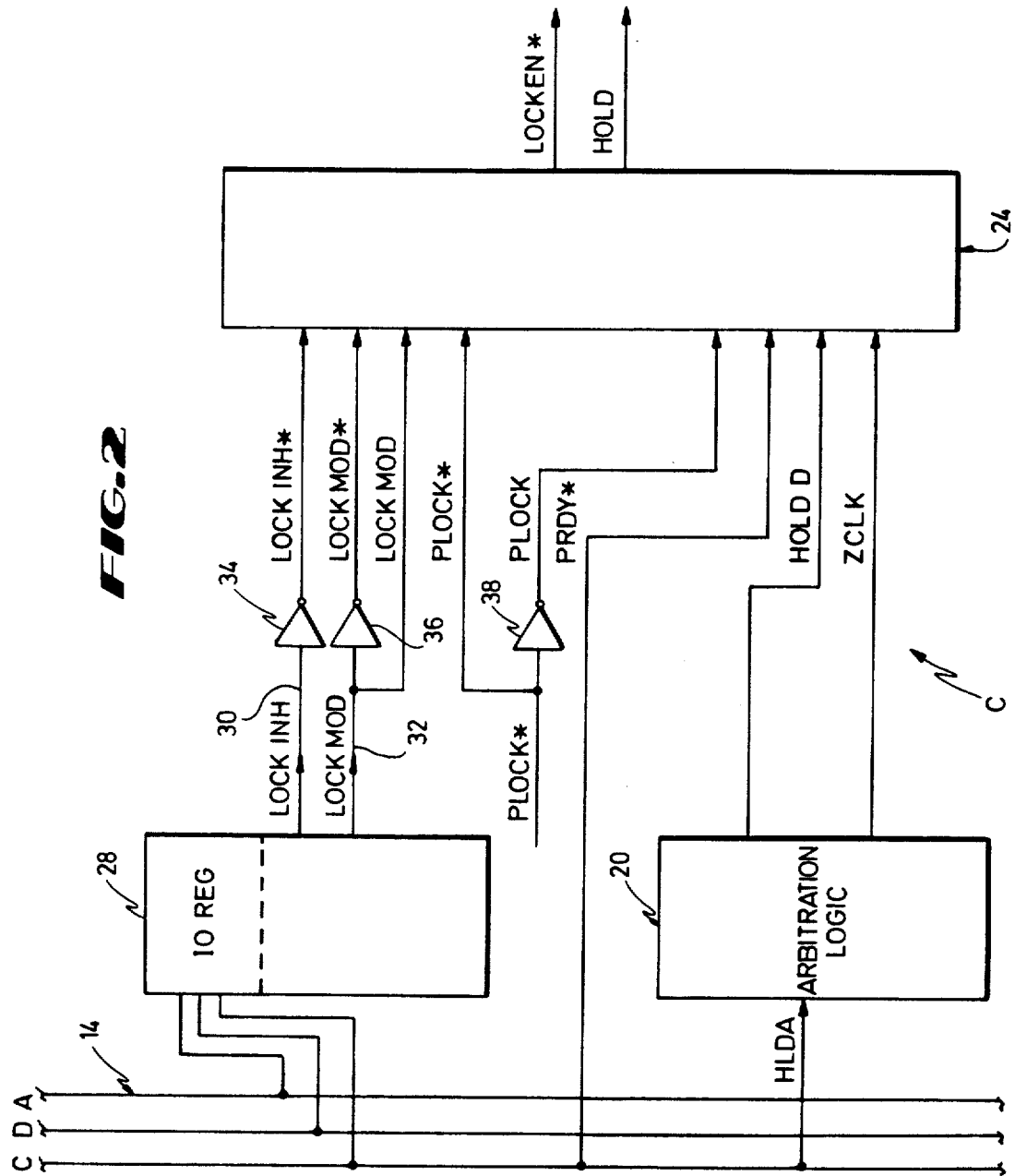
FIG. 2 is a schematic diagram of a portion of the system shown in FIG. 1 and additional register circuitry.

Referring now to FIG. 2, further aspects of the system C are disclosed. Associated with logic circuit 24 is an addressable input output register 28. Control of the LOCKEN* output, and hence, control of the mode of system operation lock cycle is controlled by the status of output signals LOCKINH and LOCKMOD. Register 28 includes at least two independently addressable bits, which can be read or written to under processor control. By writing to this two-bit register, the user programmer or system designer can specify one of three modes of operation. In mode one the PLOCK* signal from the processor 10 is always passed to the controller 12. In mode two, the PLOCK* signal is always blocked. In mode three, the PLOCK* signal is processed as follows:

1. When the cache controller has control of the bus and PLOCK* is asserted, the LOCK* to the cache controller is inhibited. The HOLD signal to the cache controller 12 from other sources is interlocked with the processor'PLOCK* signal so that any HOLD requests are inhibited until the locked cycle is completed.

2. If the cache controller 12 has control of the bus 14, but a HOLD is pending to the controller when PLOCK* is asserted, the LOCK* will be passed to the controller 12 and the HOLD will continue. When the controller 12 regains control of the bus (HOLD negated), then, on completion of the first bus cycle to the processor 10 (as signalled by the PRDY* signal), the LOCK* signal to the controller will be inhibited. As in case 1 above, the HOLD to the controller 12 is then inhibited until PLOCK* from processor 10 is negated.

3. If the controller 12 does not have control of the bus when the processor PLOCK* is asserted, the LOCK* is passed to the controller and HOLD will continue. The rest of the sequence goes as in case 2 above.

4. If the controller's HOLD line and the processor's LOCK* are asserted simultaneously, the LOCK* from the processor will be passed to the controller and the HOLD will continue.

This modified lock scheme allows the processor to execute most lock cycles out of the cache memory 16 rather than missing to system main memory 22 and allows multiprocessing with shared memory without creating problems associated with semaphore protection.

To maintain compatibility with existing application software, the system of the present invention permits the lock cycle mode to be defined based upon the status of two-bit register 28. In the preferred embodiment bit zero of register 28 defines the status of the LOCKINH output signal 30. When set to a logic high or one value, the processor PLOCK* signal is inhibited or prevented from passing to controller 12. Bit one of register 28 controls the status of the LOCKMOD signal 32, and, when set to one, causes the mode three or modified lock scheme to be implemented. Bit one, or the LOCKMOD signal, has priority over bit zero, or LOCKINH, and LOCKMOD must be set to a logic low or zero value for LOCKINH to inhibit the processor PLOCK* signal.

Thus, the various modes of operation correspond to the value of the LOCKMOD and LOCKINH bits as follows:

| LOCKMOD | LOCKINH | MODE |
| --- | --- | --- |
| 0 | 0 | Mode One - Lock passed to Controller |
| 0 | 1 | Mode Two - Lock inhibited |
| 1 | X | Mode Three - Modified Lock |

This modified lock cycle methodology is implemented in response to the LOCKINH and LOCKMOD signals by logic circuitry 24 shown in schematic block diagram form in FIG. 2. The LOCKINH and LOCKMOD output signals are inverted via inverters 34 and 36, respectively, to produce active low level input signals LOCKINH* and LOCKMOD* to circuit 24. The processor active low output PLOCK* is also inverted via inverter 38 and provided to circuit 24 as an active positive input signal designated PLOCK. The HOLD D input signal is generated by arbitration circuit 20 synchronizing the HOLD signal from system bus 14 addressed to controller 12 to the system clock signal to achieve proper bus timing. Arbitration circuit 20 also provides a ZCLK input signal to logic circuit 24. The ZCLK signal is generated as the output of a NAND-GATE which has at its inputs the inverse of the CLK2 signal (twice the frequency of the CLK1 processor internal clock) and the CLK1 signal.

Figure 3:
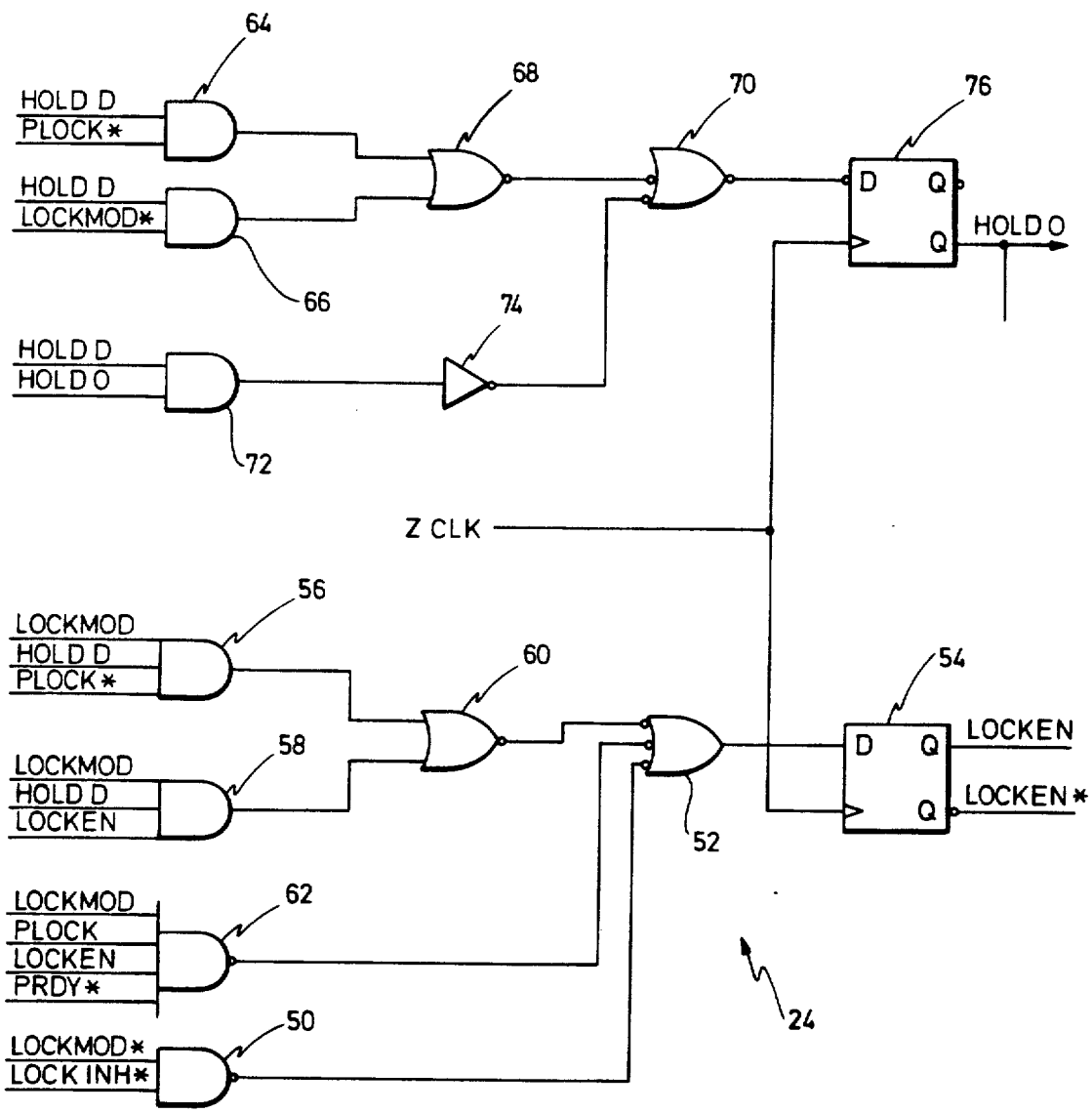
FIG. 3 is a schematic diagram of a portion of the system shown in FIG. 1.

Referring now to FIG. 3, the details of logic circuit 24 are illustrated. This logic circuit implements the following logic equations:

HOLD O = HOLD D * /MLOCK +
HOLD D * HOLD O;
LOCKEN = HOLD D * /MLOCK * /NOLOCK +
LOCKEN * HOLD D * /BLOCK +
LOCKEN * PLOCK * /PRDY * /NOLOCK +
ENABLE;

Where:
MLOCK = LOCKMOD*PLOCK,
NOLOCK = /LOCKMOD*LOCKINH,
ENABLE = /LOCKMOD*/LOCKINH.

In the foregoing logic equation, "*" indicates the AND function, "+" indicates the OR function, and "/" indicates the INVERSE function.

Referring now to FIG. 3, the logic circuit 24 includes various conventional logic elements which receive as inputs the signals which correspond to the possible states of lock cycle mode status bits, processor lock cycles, the controller hold signal and the end of processor cycle signal. These input conditions determine the output values of the HOLD O output signal which is provided to controller 12 to prevent the controller from losing control of the bus and the LOCKEN* output signal which is utilized to enable/disable the lock input to the controller and control whether lock cycle signals from the processor 10 are passed to the controller 12.

MODE ONE OPERATION

In this mode, locked processor cycles are passed to the controller. Signals LOCKMOD* and LOCKINH* are at high levels. These signals are provided as inputs to NANDGATE 50 which causes a logic low level signal to be provided as a first input signal to NANDGATE 52. Any logic low level input to NANDGATE 52 will cause the D input to flip-flop 54 to be maintained at a high level. This high level input will, when clocked by the ZCLK input, set the LOCKEN* output signal to a logic low level.

The LOCKEN* output signal is provided to ORGATE 26 (FIG. 1). Thus, when the LOCKEN* signal is low, an active low level processor PLOCK* signal, indicating a processor locked cycle, will cause the output of ORGATE 26 to transition from a high to a low level. The output signal from ORGATE 26 is provided as an active low lock input to controller 12. Thus, in this mode, processor locked cycles are always passed to controller 12.

MODE TWO OPERATION

In mode two, the processor PLOCK* signal is always blocked or inhibited. In mode two, LOCKINH is set to a high level, and LOCK MOD is set to a low level. These two input signals are inverted to LOCKMOD* and LOCKINH* and provided to NANDGATE 50 causing a logic high level output to be provided on a first input to NANDGATE 52.

Setting LOCKMOD low disables ANDGATES 56 and 58 causing their respective output signals to be at a logic low level. These signals are provided as inputs to NORGATE 60 causing the second input to NANDGATE 52 to be set to a high level.

With these initial conditions, the output of four-way NANDGATE 62 controls the status of NANDGATE 52. As long as LOCKMOD is low, the output of NANDGATE 62 will be at a high level. This output is provided as the third high level input signal to NANDGATE 52 causing the D-input of flip-flop 54 to be set to a low level. When this input is clocked by the ZCLK signal, the LOCKEN* output will be set to a high level. The high level LOCKEN* output signal is provided to ORGATE 26 (FIG. 2) causing the LOCK* input to controller 12 to be held at an inactive, high level thereby blocking any processor lock signal.

MODE THREE OPERATION

In this mode, generally the HOLD D signal which causes the controller to relinquish control of the bus is interlocked with the processor lock signal so that hold requests to the controller are blocked during processor locked cycles. In mode three, the LOCKMOD status bit is set to one or a high level. In modified lock mode, processor lock cycles are handled in accordance with the four cases described below.

Case One:

In case one, the controller 12 has control of the bus and processor lock cycles to the bus are inhibited. HOLD signals from other sources to the controller are inhibited until the lock cycle is completed. If the controller has the bus, HOLD D will be used.

In case one, the HOLD D signal is low, LOCKMOD is high and the inputs to NORGATE 60 are both low, causing a first high input to NANDGATE 52. The second input to NANDGATE 52 will either be high or go high at the end of the next processor cycle when PRDY* goes low. In MODE three, the output of gate 50 is high, and therefore in case one, the D-input to flip-flop 54 becomes low and the next ZCLK signal disables the LOCKEN* output causing the processor lock signal to the controller 12 to be inhibited. In this case, any hold requests to the controller are interlocked with the processor lock signal, PLOCK* via ANDGATE 64, ANDGATE 66, NORGATE 68 and ANDGATE 70 so that the HOLD O output is inactive until PLOCK* reverts to a high level at the completion of the processor lock cycle.

Case Two:

If the controller has control of the bus 14 but a HOLD is pending (HOLD D high), a lock signal from the processor will be passed to the controller 12 and the HOLD will continue. When the cache controller 12 regains control of the bus 14 (HOLD D negated), then on completion of the first cycle to the processor 10 (as signaled by PRDY*) the lock signal to controller 12 will be inhibited. As in case one, the HOLD φ to the controller 12 is then inhibited until PLOCK is negated.

In this case the LOCKMOD, HOLD D and LOCKEN signals to ANDGATE 58 are active, so the LOCKEN* signal is low, allowing the PLOCK* signal to pass through ORGATE 26. This condition stays true until the HOLD D signal is removed.

The HOLD φ output to the controller is maintained as follows. A hold pending before the lock cycle was asserted set HOLD D high, and since PLOCK* was also at a high level ANDGATE 64 was enabled causing the output of NORGATE 68 to be set to a low level. This in turn disabled ANDGATE 70 causing the HOLD φ output of flip-flop 76 to be set active high. With these intitial conditions, ANDGATE 72 was enabled and the output signal from inverter 74 was at a low level, and stays low until HOLD D is negated.

When HOLD D is negated and the PRDY* signal goes to active low level at the end of the next processor cycle, the output of NANDGATE 62 is set high. When HOLD D was negated, the output of ANDGATES 56 and 58 were set to a low level, enabling NORGATE 60. Thus when NANDGATE 62 was enabled by PRDY*, the output of NANDGATE 52 was set low causing the LOCKEN* output to be set high on the next ZCLK pulse thereby inhibiting the processor lock PLOCK* signal via ORGATE 26.

Case Three:

In case three, if the controller does not have control of the bus, HOLD D is high, LOCKMOD is high and LOCKEN is high, so ANDGATE 58 is enabled causing the output of NORGATE 60 to be set to a low level. Thereafter, the output of NANDGATE 52 will be high and on the next ZCLK pulse the LOCKEN* output of flip-flop 54 will be set to an active low level which causes processor lock cycle PLOCK*, signals to be passed to the controller 12 via ORGATE 26. The hold is continued via gates 64, 66 and 72. The rest of the sequence then transpires as in case two.

Case Four:

If HOLD D and PLOCK are asserted simultaneously, the combination of LOCKMOD, HOLD D and PLOCK* by ANDGATE 56 sets an input to NORGATE 60 high, thus setting an input to NANDGATE 52 low, which in turn sets the input of the flip-flop 54 high, causing the LOCKEN* output from flip-flop 54 to be set low, allowing the processor lock PLOCK* signal to be passed to the controller via ORGATE 26. The hold is continued via gates 64, 66 and 72.

In this manner, the system of the present invention may be operated in three modes, wherein mode 1 and mode 2 are consistent with existing lock cycle methodologies and mode 3 provides enhanced lock cycle management which improves system cache memory performance without increasing the probability of errors. The foregoing disclosure and description of the invention are illustrative and explanatory thereof, and various changes in the size, shape, materials, components, circuit elements, wiring connections and contacts, as well as in the details of the illustrated circuitry, construction and method of operation may be made without departing from the spirit of the invention.

We claim:

1. A processor lock cycle control system for use with a computer system of a type including a processor which executes certain instructions in locked bus cycles by issuing a bus lock signal, a cache memory system including a cache memory control circuit, and a system bus wherein the cache memory control circuit interfaces between the processor and the system bus to control access to the system bus by the processor, and wherein the computer system includes other system elements sharing the system bus with the processor, control of the system bus ordinarily being transferred from the cache memory control circuit to other system elements sharing the system bus in response to a bus request signal, said processor lock cycle control system comprising:

means for selectively disabling processor lock signals to the cache memory control circuit; and means for inhibiting bus request signals from other system elements sharing the system bus to the cache control circuit during processor locked bus cycles; and whereas the processor lock cycle control system further comprises:

means for causing the system to operate in one of three modes of processor lock cycle operation, wherein:

a. in mode one all processor bus lock cycle signals are passed to said cache memory control circuit;

b. in mode two all processor bus lock cycle signals are inhibited;

c. in mode three processor bus lock cycles are selectively disabled and bus request signals to said cache memory control circuit are inhibited during execution of locked bus cycles by the processor.

2. The processor lock cycle control system of claim 1, wherein said means for causing the processor lock cycle control system to operate in one of three mode comprises:

a mode selection register including at least two status bits, the value of said status bits being subject to control by the processor; and means for generating mode selection output signals based upon the status bits of said mode selection register.

3. The processor lock cycle control system of claim 2, wherein said mode selection output signal means includes means for generating a two-bit output coded signal to select a mode of processor lock cycle operation.

4. The processor lock cycle control system of claim 3, wherein:

said mode selection output signal means provides a binary LOCKMOD signal and a binary LOCKINH signal which in combination indicate a selected mode of operation;

said processor provides an output PRDY signal to indicate completion of a bus cycle;

said processor provides a PLOCK* output signal to indicate active processor locked bus cycle;

said computer system includes means for generating a HOLD D signal in response to active bus request signals from other system elements;

means for providing inverted LOCKMOD, LOCKINH, PLOCK*, and PRDY input signals, said inverted signals being designated LOCKMOD*, LOCKINH*, PLOCK and PRDY*, respectively;

wherein said means for selectively disabling processor bus lock signals and said means for inhibiting bus request signals comprises a logic circuit means for generating a LOCKEN* output signal to selectively disable processor bus cycle lock signals to said cache memory control circuit, and HOLD O output signal to selectively inhibit hold requests to said cache memory control circuit, said logic circuit receiving as inputs the LOCKMOD, LOCKMOD*, PLOCK, PLOCK*, PRDY, PRDY*, HOLD D and a system clock synchronizing ZCLK signal and providing output control signals LOCKEN and HOLD O in accordance with the following logic sequence:

HOLD O = HOLD D * /MLOCK +
HOLD D * HOLD O;

LOCKEN = HOLD D * /MLOCK * /NOLOCK +
LOCKEN * HOLD D * /BLOCK +
LOCKEN * PLOCK * /PRDY * /NOLOCK +
ENABLE;

where:
MCLOCK=LOCKMOD*PLOCK,
NOLOCK=/LOCKMOD*LOCKINH,
ENABLE=/LOCKMOD*/LOCKINH;

where, in the foregoing logic equation, "*" indicates the AND function, "+" indicates the OR function, and "/" indicates the INVERSE function.

5. A method of controlling processor locked bus cycle operation of a computer system including a processor of a type which issues bus lock cycle signals to prevent interruption of certain instruction sequences, a cache memory, a cache memory controller interfaces between the processor and the system bus to control access to the system bus by the processor and wherein the system includes other system elements sharing control of the system bus with the processor and cache memory controller control of the system bus being transferred from the cache memory controller to such other system elements sharing control of the system bus in response to a bus request signal, said processor locked bus cycle control method comprising the steps of:

a. setting a locked cycle mode of operation to one of three modes;
b. in mode one, passing all processor bus lock signals to the cache memory controller;
c. in mode two, blocking all processor bus lock signals; and
d. in mode three, processing processor bus lock signals in accordance with the following logic scheme:
   i. when the cache memory control has control of the system bus and an active processor bus lock signal is asserted, blocking the active processor bus lock signal to the cache memory controller and inhibiting bus request signals from other system elements until the processor completes the locked bus cycle;
   ii. when the cache memory controller has control of the system bus but a bus request signal from other system elements sharing control of the system bus is pending when an active processor bus lock signal is asserted, passing the active processor bus lock signal to the cache memory controller and continuing the bus request signal from the other system element sharing control of the system bus; when the bus request signal is negated, blocking the bus lock signal to the cache memory controller and inhibiting bus request signals to the cache memory controller;
   iii. when the cache memory controller does not have control of the system bus when an active processor bus lock signal is asserted, passing the bus lock signal to the cache memory controller, and continuing the bus request signal; thereafter when the bus request signal is negated, blocking the bus lock signal to the cache memory controller and inhibiting bus request signals to the cache memory controller; and
   iv. when a bus request signal to the cache memory controller and an active processor bus lock cycle signal are asserted simultaneously, passing the bus lock signal to the cache memory controller and continuing the bus request signal.

* * * * *

UNITED STATES PATENT AND TRADEMARK OFFICE
CERTIFICATE OF CORRECTION

PATENT NO.　　:　　5,163,143

DATED　　　　:　　November 10, 1992

INVENTOR(S)　:　　Paul R. Culley, et al.

It is certified that error appears in the above-identified patent and that said Letters Patent is hereby corrected as shown below:

In Col. 10, Line 44, please change "/BLOCK" to --/NOLOCK--.

In Col. 10, Line 48, please change "MCLOCK" to --MLOCK--.

In Col. 11, Line 10, pleae change "memory control" to --memory controller--.

Signed and Sealed this

Nineteenth Day of October, 1993

Attest:

BRUCE LEHMAN

Attesting Officer　　　Commissioner of Patents and Trademarks

UNITED STATES PATENT AND TRADEMARK OFFICE
CERTIFICATE OF CORRECTION

PATENT NO. : 5,163,143
DATED : November 10, 1992
INVENTOR(S) : Paul R. Culley et al.

It is certified that error appears in the above-identified patent and that said Letters Patent is hereby corrected as shown below:

Column 5,
Line 46, delete "processor" and insert -- processor's --.
Line 63, delete "LOCK*" and insert -- PLOCK* --.

Column 6,
Line 56, delete "/BLOCK" and insert -- /NO LOCK --.

Column 9,
Line 61, delete "mode" and insert -- modes --.

Signed and Sealed this

Seventeenth Day of January, 2006

JON W. DUDAS
*Director of the United States Patent and Trademark Office*